United States Patent
Miyatake (10) Patent No.: US 8,783,971 B2
(45) Date of Patent: Jul. 22, 2014

(54) OPTICAL TRANSMISSION APPARATUS AND OPTICAL TRANSMISSION SYSTEM

(75) Inventor: Tetsuya Miyatake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 676 days.

(21) Appl. No.: 13/079,263

(22) Filed: Apr. 4, 2011

(65) Prior Publication Data

US 2011/0274392 A1    Nov. 10, 2011

(30) Foreign Application Priority Data

May 7, 2010    (JP) .................... 2010-107511

(51) Int. Cl.
*G02B 6/36* (2006.01)
*G02B 6/42* (2006.01)

(52) U.S. Cl.
CPC ............ *G02B 6/4214* (2013.01); *G02B 6/4245* (2013.01); *G02B 6/4244* (2013.01); *G02B 6/4206* (2013.01)
USPC .................... 385/93; 385/14; 385/34

(58) Field of Classification Search
None
See application file for complete search history.

(56) References Cited

U.S. PATENT DOCUMENTS

| | | | | |
|---|---|---|---|---|
| 5,218,654 A | * | 6/1993 | Sauter | 385/24 |
| 5,757,994 A | * | 5/1998 | Schoenwald et al. | 385/44 |
| 5,805,749 A | * | 9/1998 | Sato | 385/34 |
| 7,212,713 B2 | * | 5/2007 | Fukuzawa et al. | 385/50 |
| 2003/0113067 A1 | * | 6/2003 | Koh et al. | 385/48 |
| 2007/0189670 A1 | * | 8/2007 | Nagata et al. | 385/48 |
| 2009/0304323 A1 | * | 12/2009 | Matsubara | 385/14 |

FOREIGN PATENT DOCUMENTS

| | | |
|---|---|---|
| JP | 53-146641 A | 12/1978 |
| JP | 61-129606 A | 6/1986 |
| JP | 2001-141965 | 5/2001 |
| JP | 2005-338704 A | 12/2005 |
| JP | 2006-330697 | 12/2006 |
| JP | 2008-15224 A | 1/2008 |
| JP | 2009-31633 | 2/2009 |

OTHER PUBLICATIONS

Japanese Office Action mailed Sep. 24, 2013 for corresponding Japanese Application No. 2010-107511, with Partial English-language Translation.

* cited by examiner

*Primary Examiner* — Hemang Sanghavi (74) *Attorney, Agent, or Firm* — Fujitsu Patent Center (57) ABSTRACT

An optical transmission apparatus comprising a first gradient index lens, an optical receiver, and a second gradient index lens. The first gradient index lens is connected to an end of an optical transmission line. The optical receiver receives light and is provided to an electronic device. The second gradient index lens is arranged between the first gradient index lens and the optical receiver.

19 Claims, 8 Drawing Sheets

OPTICAL TRANSMISSION APPARATUS AND OPTICAL TRANSMISSION SYSTEM

CROSS-REFERENCE TO RELATED APPLICATIONS

This application is based upon and claims the benefit of priority of the prior Japanese Patent Application No. 2010-107511, filed on May 7, 2010, the entire contents of which are incorporated herein by reference.

FIELD

Embodiments discussed herein relate to a technique for an optical transmission apparatus that includes a gradient index lens and an optical transmission system that includes the optical transmission apparatus.

BACKGROUND

In the area of high performance computing (HPC), such as high-end servers and supercomputers, improvements in the performance of signal processing have been increasingly desired in recent years. As a result, development of high-speed high-capacity (high-density) data transmission technique used in a transmission line between racks, between boards, within a board, and the like is a matter of urgent necessity.

However, with traditional electric transmission technology, which is reaching the limit of increasing the speed and capacity, it is generally assumed that data transmission performance (speed, bandwidth (=total throughput)) required by HPC systems is difficult to achieve.

As a breakthrough to such a limit in the electric transmission technology, optical interconnection technology of performing data transmission using light has begun to attract great attention. To actualize a high-speed high-capacity optical interconnection, the pitch of electric wiring of a semiconductor device (integrated circuit (IC)), such as a photoelectric conversion element, driver, or receiver amplifier, needs to be narrow. However, the limitations of processing accuracy restrict a reduction in the pitch of wiring on a printed board.

To address this, an intermediate substrate (interposer) for converting the pitch of wiring on a device into the pitch of wiring on a printed board is used. For high-speed high-capacity optical interconnection, with increasingly faster data speeds, it is necessary to reduce the capacity of an optical device to obtain a band of the optical device. Because of this, in particular, a photodiode (PD) may have a reduced diameter of its light sensing area, and that diameter may be smaller than the diameter of the core of the optical transmission line (for example, smaller than 50 µm in the case of a multi-mode fiber).

In this case, to couple optical signals that have propagated in the optical transmission line to a light sensing surface of the photodiode without a loss, a structure for concentrating the optical signals (condenser) is necessary. In consideration of mounting on an interposer, a gradient index (GRIN) lens which allows the flatness of the interposer is effective as the structure for concentrating optical signals from an optical transmission line.

Figure 7:
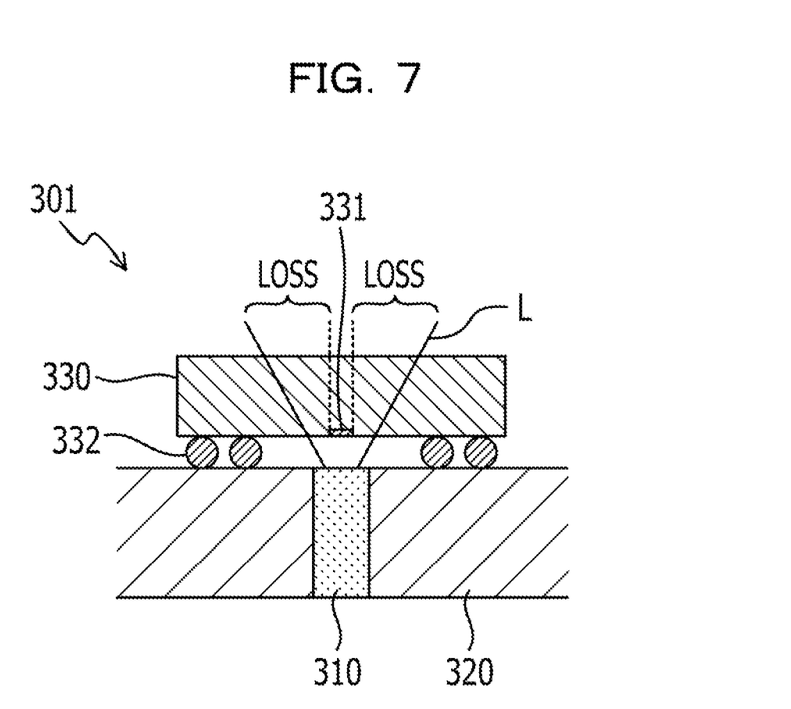
FIG. 7 is a cross-sectional view of an optical transmission system according to a first reference technique.

FIG. 7 is a cross-sectional view of an optical transmission system 301 according to a first reference technique. As illustrated in FIG. 7, the optical transmission system 301 includes a gradient index lens 310, a substrate 320, and an electronic device 330.

The electronic device 330 is flip-chip mounted on the substrate 320 using a plurality of bump electrodes 332. The gradient index lens 310 is disposed inside the substrate 320. Although not illustrated, the gradient index lens 310 receives light that has exited from an optical transmission line and been reflected by a reflector, for example. The gradient index lens 310 has a refractive index with a parabolic variation that decreases from its central region to its outer region.

Figure 8:
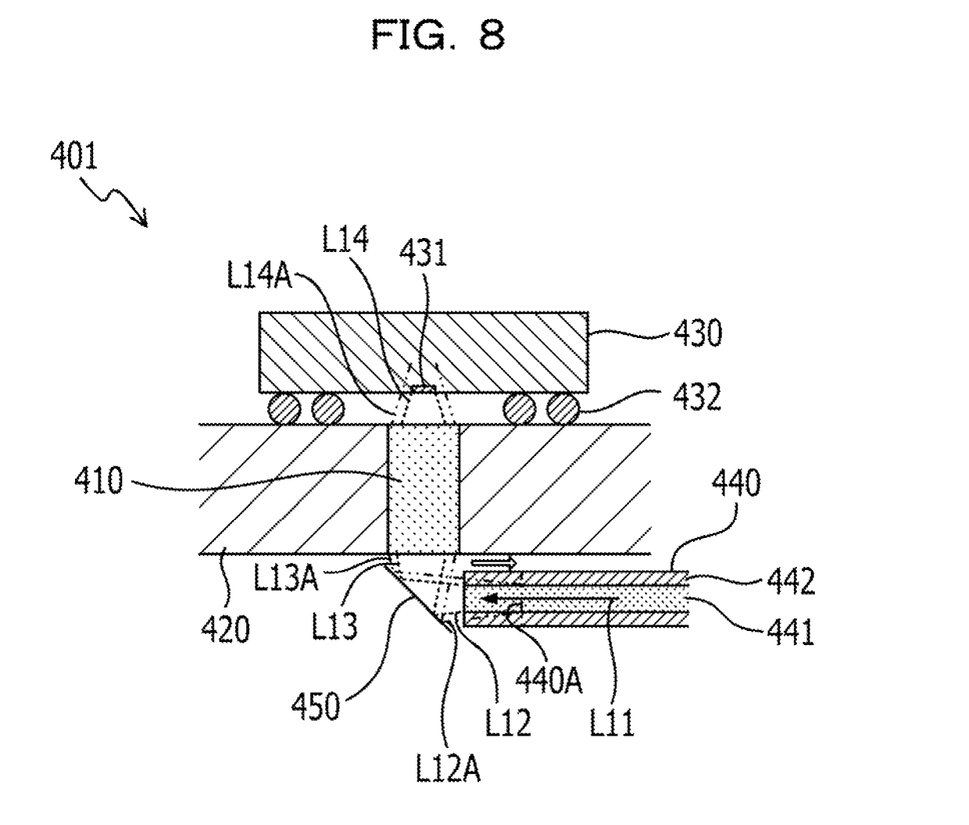
FIG. 8 is a cross-sectional view of an optical transmission system according to a second reference.

As illustrated in FIG. 7, when divergent light L exits from the gradient index lens 310, a component of the divergent light L that does not enter a photodiode 331 being a light sensing element of the electronic device 330 is lost. FIG. 8 is a cross-sectional view of an optical transmission system 401 according to a second reference technique.

As illustrated in FIG. 8, the optical transmission system 401 includes a gradient index lens 410, a substrate 420, an electronic device 430, an optical transmission line 440, and a reflector 450. The electronic device 430 is flip-chip mounted on the substrate 420 using a plurality of bump electrodes 432.

The gradient index lens 410 is disposed inside the substrate 420. The gradient index lens 410 has a refractive index with a parabolic variation that decreases from its central region to its outer region. The gradient index lens 410 receives light that has passed through a core portion 441 covered by a clad layer 442 of the optical transmission line 440 (optical path L11), exited from the core portion 441 (optical path L12), and been reflected by the reflector 450 (optical path L13).

Unlike the gradient index lens 310 illustrated in FIG. 7, the gradient index lens 410 concentrates incident light having an appropriate length (optical path L13) on a photodiode 431 of the electronic device 430 (optical path L14).

Japanese Unexamined Patent Application Publication Nos. 2006-330697, 2001-141965, and 2009-31633 are examples of related art.

For the optical transmission system 401 illustrated in FIG. 8, if the optical transmission line 440 becomes misaligned toward the direction remote from the reflector 450 (optical transmission line 440A), for example, divergent light exiting from the optical transmission line 440A (optical path L12A) and light reflected by the reflector 450 (optical path L13A) also become misaligned.

In response to this, the location of light concentrated by the gradient index lens 410 (optical path L14A) is away from the photodiode 431. When the location of concentrated light deviates, as described above, an optical coupling loss occurs. Such an optical coupling loss occurs if the electronic device 430 is used at not only the light sensing side but also the light emitting side.

SUMMARY

According to an aspect of the invention, an optical transmission apparatus includes a first gradient index lens, an optical receiver, and a second gradient index lens. The first gradient index lens is connected to an end of an optical transmission line. The optical receiver receives light and is provided to an electronic device. The second gradient index lens is arranged between the first gradient index lens and the optical receiver.

Advantages of the invention will be realized and attained via the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
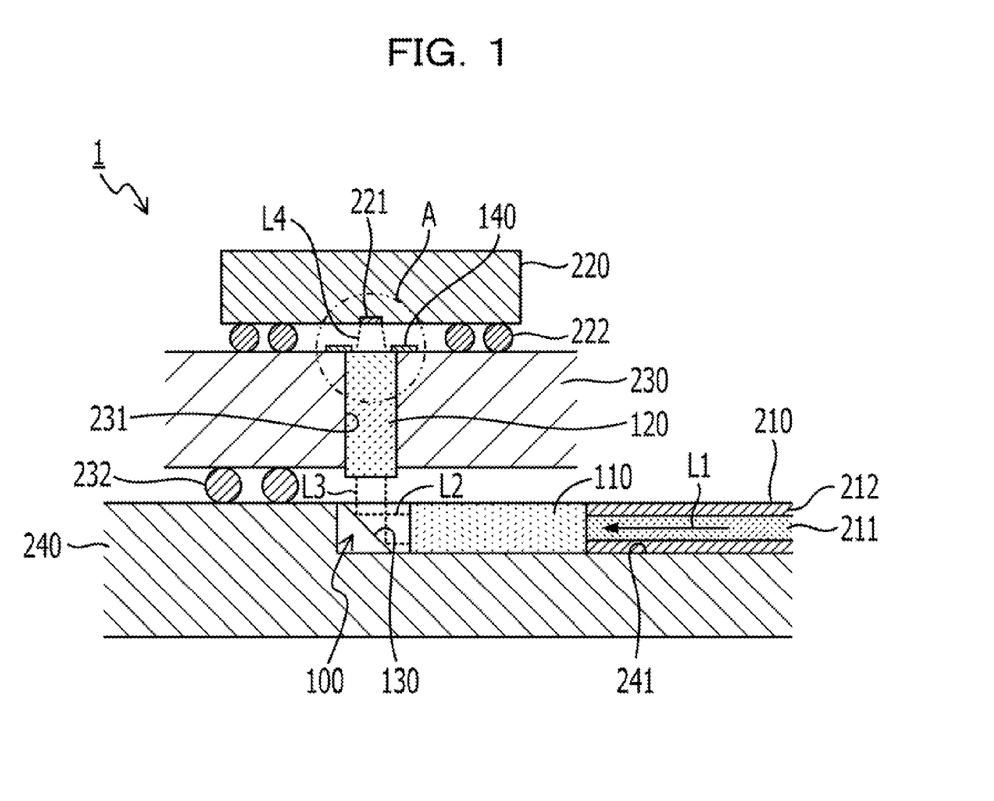
FIG. 1 is a cross-sectional view of an optical transmission system.
Figure 2:
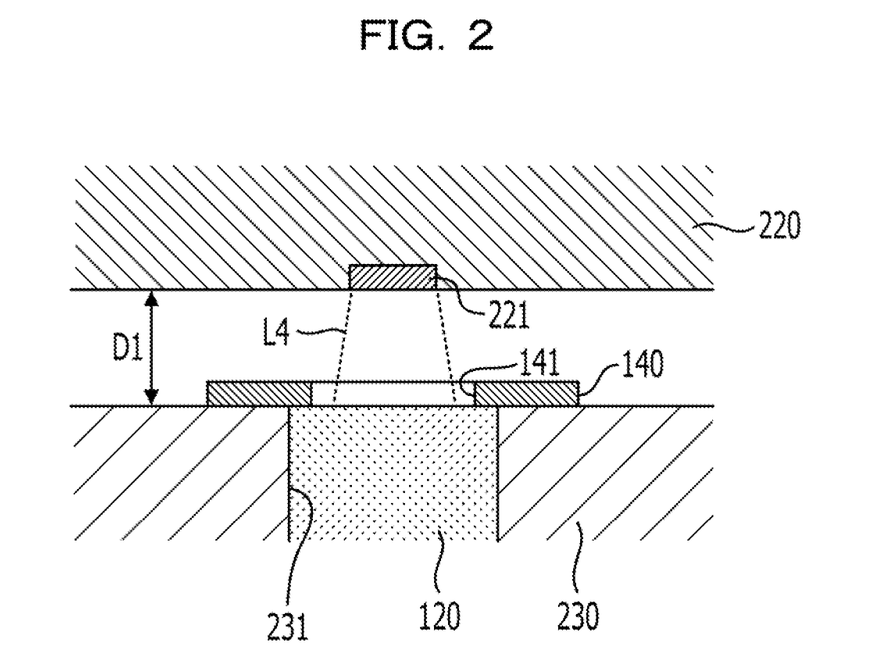
FIG. 2 is an enlarged view of a section A illustrated in FIG. 1.

An optical transmission apparatus and an optical transmission system according to an embodiment are described with reference to the drawings. FIG. 1 is a cross-sectional view of an optical transmission system 1. FIG. 2 is an enlarged view of a section A illustrated in FIG. 1.

As illustrated in FIG. 1, the optical transmission system 1 according to an embodiment includes an optical transmission apparatus 100, an optical transmission line 210, and an electronic device 220.

The optical transmission system 1 further includes an intermediate substrate 230 on which the electronic device 220 is flip-chip mounted using a plurality of bump electrodes 222 and a wiring substrate 240 on which the intermediate substrate 230 is flip-chip mounted using a plurality of bump electrodes 232.

The optical transmission apparatus 100 includes a first gradient index lens 110, a second gradient index lens 120, a reflector 130 being one example of optical-path changing means, and a stopper 140. The optical transmission line 210 includes a core portion 211 and a clad portion 212 covering the core portion 211.

The electronic device 220 includes a photodiode 221. The photodiode 221 is an example of optical communication means for at least one of receiving and transmitting light. For the present embodiment, the photodiode 221 receives light. A vertical cavity surface emitting laser (VCSEL) for transmitting light may also be used as the optical communication means. In this case, for optical paths L1 to L4, which are described below, light is oppositely guided.

The first gradient index lens 110 is fused (attached) to an emission end of the optical path L1 passing through the core portion 211 of the optical transmission line 210. The core portion 211 is covered by the clad portion 212. The core portion 211 can have a diameter larger than the diameter of the light sensing area of the photodiode 221, for example.

The first gradient index lens 110 has a substantially columnar shape having a length at which light exiting from the core portion 211 of the optical transmission line 210 (optical path L1) can exit as substantially parallel light (optical path L2). The first gradient index lens 110 and the optical transmission line 210 are arranged along the wiring substrate 240 and, for example, can be disposed in a depression 241 formed in a surface of the wiring substrate 240 that faces the intermediate substrate 230.

The reflector 130 is also arranged in the depression 241 of the wiring substrate 240. The reflector 130 changes the optical paths L2 and L3 located between the first gradient index lens 110 and the second gradient index lens 120.

For the present embodiment, the reflector 130 reflects substantially parallel light L2 exiting from the first gradient index lens 110 as substantially parallel light L3 in the stacking direction of the intermediate substrate 230 with respect to the wiring substrate 240 (in the upward direction in FIG. 1).

The second gradient index lens 120 is arranged between the photodiode 221 and the reflector 130. For the present embodiment, the second gradient index lens 120 has a numerical aperture (NA) larger than that of the first gradient index lens 110. However, making the numerical aperture of the second gradient index lens 120 smaller than or substantially equal to that of the first gradient index lens 110 can change the shape of convergent light (optical path L4) to exit therefrom, as described below.

The second gradient index lens 120 is arranged in the whole area of a through-hole 231 of the intermediate substrate 230 and projects from the through-hole 231 toward the wiring substrate 240. The through-hole 231 penetrates through the intermediate substrate 230 along the stacking direction with respect to the wiring substrate 240 (upward in FIG. 1). If the intermediate substrate 230 is not provided, the second gradient index lens 120 can be disposed in the wiring substrate 240, for example.

The second gradient index lens 120 has a substantially columnar shape having a length at which the substantially parallel light that has been reflected by the reflector 130 and has entered the second gradient index lens 120 (optical path L3) can exit toward the photodiode 221 as the convergent light (optical path L4). The second gradient index lens 120 causes the convergent light (optical path L4) having a diameter smaller than the diameter of the core portion 211 of the optical transmission line 210 to enter the photodiode 221.

Each of the first gradient index lens 110 and the second gradient index lens 120 has a refractive index that decreases from its central region to its outer region. For the present embodiment, the above refractive index has a parabolic variation that decreases from its central region to its outer region.

The stopper 140 is arranged at an end of the through-hole 231 of the intermediate substrate 230 that is adjacent to the electronic device 220 and is used to position the second gradient index lens 120 with respect to the photodiode 221. For the present embodiment, the stopper 140 is a substantially ring-shaped structure that is in contact with an outer edge portion of the second gradient index lens 120.

The second gradient index lens 120 can be fixed to the through-hole 231 by being attached thereto, for example, when having been positioned by the stopper 140. The stopper 140 positions the second gradient index lens 120 such that the distance D1 from an end face of the second gradient index lens 120 that is adjacent to the electronic device 220 to the electronic device 220 is substantially equal to a distance (working distance) in which the principal distance is subtracted from the focal length of the second gradient index lens 120.

As illustrated in FIG. 2, the stopper 140 has a central through-hole 141 with a size at which the convergent light L4 exiting from the second gradient index lens 120 is not blocked. The stopper 140 can be formed by patterning, for example. The stopper 140 can be made of any material. Examples of the material of the stopper 140 can include a metal, polyimide, and plastic. If the intermediate substrate 230 is connected to the wiring substrate 240 by reflowing, the stopper 140 may preferably be heat resistant to approximately 200° C. to 300° C., for example.

Figure 3:
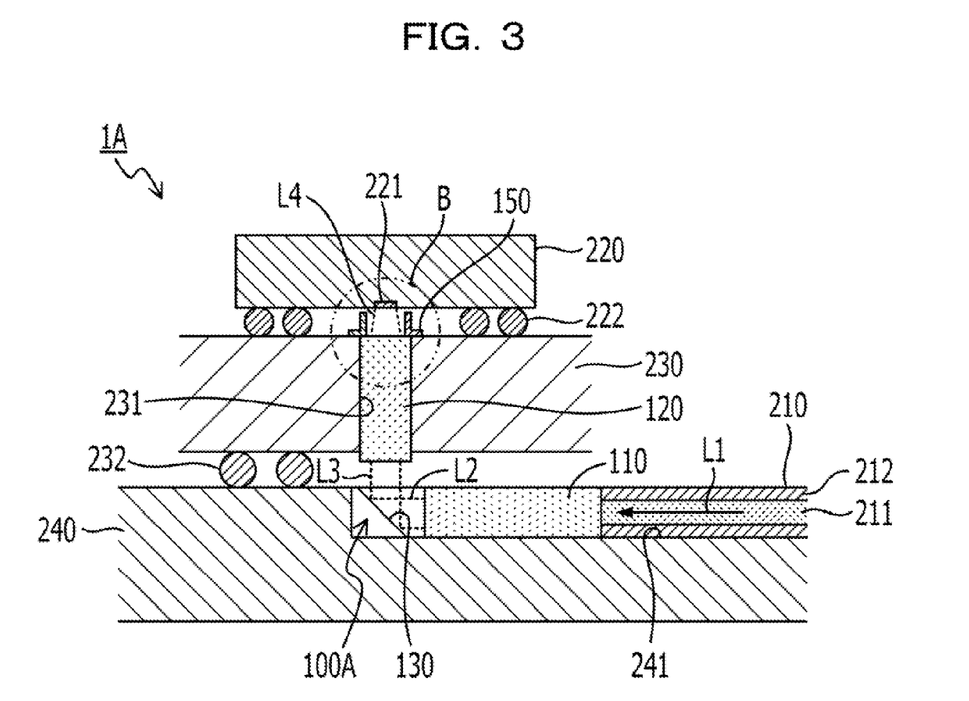
FIG. 3 is a cross-sectional view of an optical transmission system according to a modification.
Figure 4:
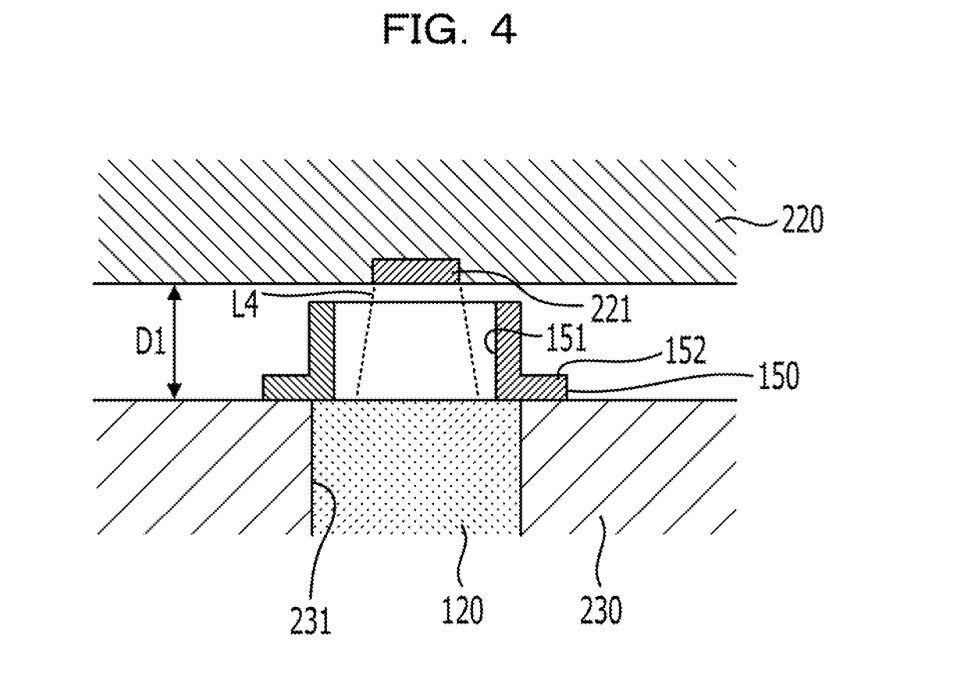
FIG. 4 is an enlarged view of a section B illustrated in FIG. 3.

FIG. 3 is a cross-sectional view of an optical transmission system 1A according to a modification. FIG. 4 is an enlarged view of a section B in FIG. 3. The optical transmission system 1A according to this modification differs from the optical transmission system 1 illustrated in FIG. 1 in that the optical transmission system 1A does not include the stopper 140 illustrated in FIGS. 1 and 2 but includes a stopper 150 illustrated in FIGS. 3 and 4. Thus only the stopper 150 is described.

The stopper 150 is a substantially cylindrical (tubular) structure that includes an end adjacent to the second gradient index lens 120, the end being in contact with an outer edge portion of the second gradient index lens 120. The stopper 150 includes a flange portion 152 being in contact with the intermediate substrate 230 at the above-described end adjacent to the intermediate substrate 230. The axial length of the stopper 150 may preferably be more than half of the distance D1 between the electronic device 220 and the intermediate substrate 230 and may more preferably be greater than or substantially equal to 80% of the distance D1.

The stopper 150 can prevent a residue (e.g., resin) resulting from the bump electrodes 222 in flip-chip mounting the electronic device 220 on the intermediate substrate 230 from adhering to the end face of the second gradient index lens 120 or the photodiode 221.

There may be an underfill provided in a gap between the bump electrodes 222 between the electronic device 220 and the intermediate substrate 230. The underfill can absorb a stress resulting from a difference between the coefficient of thermal expansion of the electronic device 220 and that of the intermediate substrate 230 occurring when the temperature changes due to the environment or during operation.

If there is an underfill between the electronic device 220 and the intermediate substrate 230, as described above, the stopper 150 can prevent the underfill from adhering to the end face of the second gradient index lens 120 or the photodiode 221.

The stoppers 140 and 150 may be formed integrally with the intermediate substrate 230. Alternatively, the stopper 140 illustrated in FIGS. 1 and 2 may be arranged in a larger diameter section formed at an end of the through-hole 231 of the intermediate substrate 230 that is adjacent to the electronic device 220.

For the above-described present embodiment, the first gradient index lens 110 is connected to an end of the optical transmission line 210. The second gradient index lens 120 is arranged between the photodiode (communication means) 221 of the electronic device 220 and the second gradient index lens 120.

Accordingly, the occurrence of optical coupling loss resulting from misalignment of the first gradient index lens 110 can be reduced by the use of the optical paths L2 and L3, which are located between the first gradient index lens 110 and the second gradient index lens 120, being made substantially or nearly parallel or the like. Therefore, with the present embodiment, the occurrence of optical coupling loss can be reduced.

For the present embodiment, the first gradient index lens 110 has a numerical aperture that differs from that of the second gradient index lens 120. Furthermore, for the present embodiment, the numerical aperture of the first gradient index lens 110 is smaller than that of the second gradient index lens 120. With such an adjustment of the numerical apertures, the shapes of the optical paths (L1 to L4) between the optical transmission line 210 and the electronic device 220 are adjustable.

For the present embodiment, the electronic device 220 is mounted on the intermediate substrate 230, and the intermediate substrate 230 is mounted on the wiring substrate 240. The intermediate substrate 230 has the through-hole 231 penetrating therethrough along the stacking direction with respect to the wiring substrate 240, and the second gradient index lens 120 is at least partly arranged in the through-hole 231. Accordingly, a space for use in mounting the wiring substrate 240 can be reserved.

Figure 5:
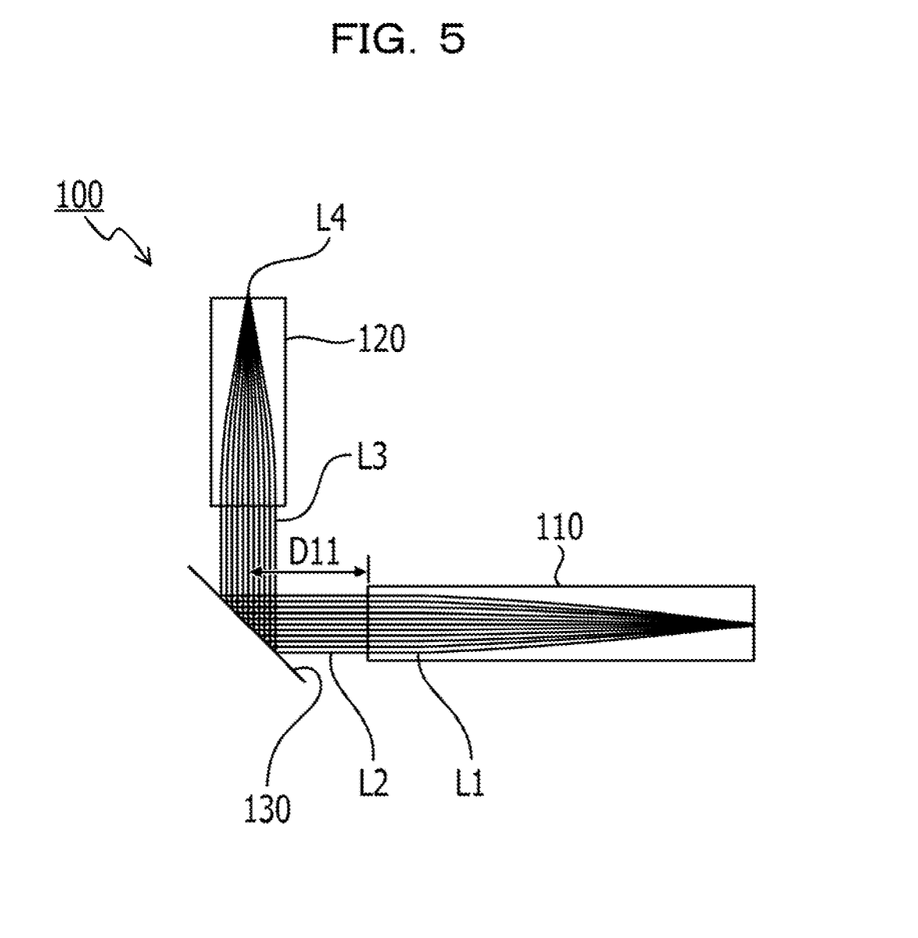
FIG. 5 is a first diagram of an optical path of the optical transmission apparatus.
Figure 6:
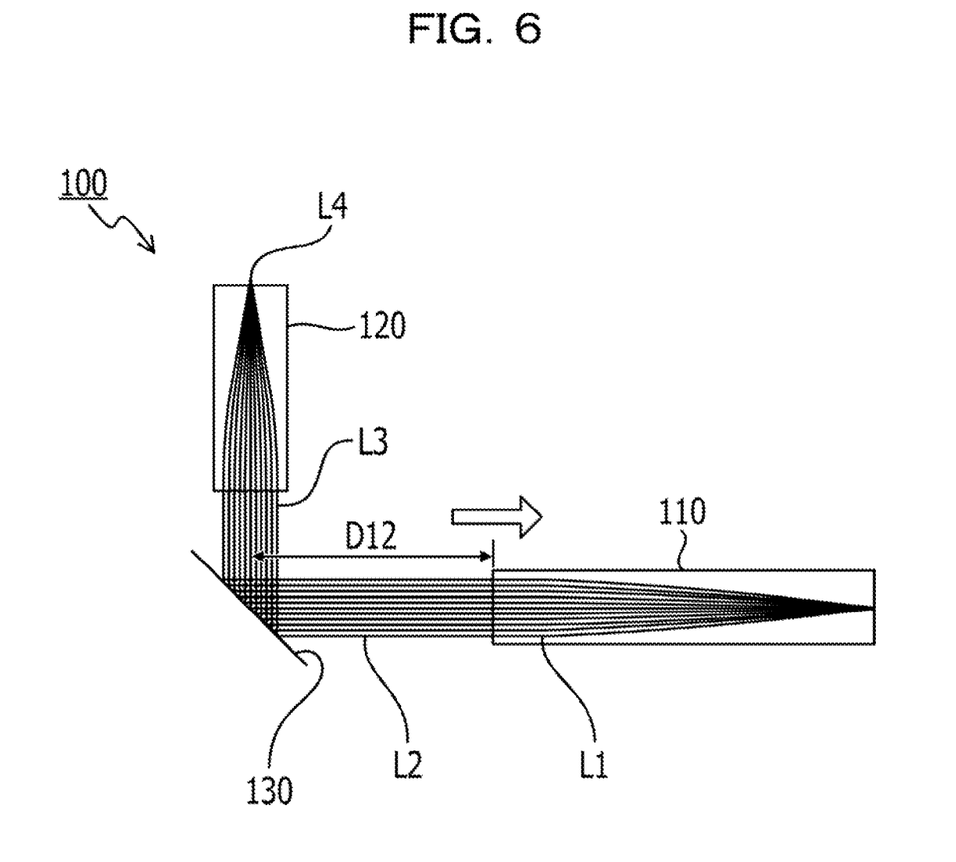
FIG. 6 is a second diagram of the optical path of the optical transmission system.

For the present embodiment, light travelling the optical path L2 extending between the first gradient index lens 110 and the reflector 130 is substantially parallel light. Therefore, as illustrated in FIGS. 5 and 6, if the distance between the first gradient index lens 110 and the reflector 130 varies, for example, the distance changes from the distance D11 (e.g., approximately 200 μm) to the distance D12 (e.g., approximately 400 μm), displacement of the subsequent optical paths L3 and L4 can be reduced. Consequently, the occurrence of optical coupling loss resulting from misalignment of the first gradient index lens 110 can be reliably reduced.

For the present embodiment, the stoppers 140 and 150 are arranged at an end of the through-hole 231 of the intermediate substrate 230 that is adjacent to the electronic device 220 and positions the second gradient index lens 120 with respect to the photodiode 221. Accordingly, the occurrence of optical coupling loss resulting from misalignment of the second gradient index lens 120 can be reduced.

For the present embodiment, the stopper 140 illustrated in FIGS. 1 and 2 is a substantially ring-shaped structure that is in contact with an outer edge portion of the second gradient index lens 120. Therefore, the occurrence of optical coupling loss resulting from misalignment of the second gradient index lens 120 can be reliably reduced even with a simple structure.

For the modification of the present embodiment, the stopper 150 illustrated in FIGS. 3 and 4 is a substantially cylindrical structure that includes an end being in contact with the outer edge portion of the second gradient index lens 120. Therefore, a residue resulting from the bump electrodes 222 in flip-chip mounting the electronic device 220 or an underfill provided in a gap between the bump electrodes 222 can be prevented from adhering to the second gradient index lens 120 or the photodiode 221.

For the modification of the present embodiment, the stopper 150 includes the flange portion 152 at its end adjacent to the second gradient index lens 120, the flange portion 152 being in contact with the intermediate substrate 230. Accordingly, the above-described residue or underfill can be prevented from adhering to the second gradient index lens 120, and misalignment of the second gradient index lens 120 can be reliably prevented. Furthermore, if the stopper 150 is arranged in the vicinity of the bump electrodes 222 of the electronic device 220, interference with the bump electrodes 222 can be effectively reduced.

With the optical transmission apparatus and the optical transmission system disclosed in the specification, the occurrence of optical coupling loss can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. An optical transmission apparatus comprising:
    a first gradient index lens connected to an end of an optical transmission line;
    an optical receiver that receives light, the optical receiver being provided to an electronic device, the electronic device being mounted on an intermediate substrate, the intermediate substrate being mounted on a wiring substrate, and the intermediate substrate having a through-hole penetrating therethrough in a stacking direction with respect to the wiring substrate;
    a second gradient index lens arranged between the first gradient index lens and the optical receiver, and at least partly arranged in the through-hole of the intermediate substrate; and
    a stopper that positions the second gradient index lens with respect to the optical receiver, the stopper being arranged at an end of the through-hole of the intermediate substrate, the end being adjacent to the electronic device,
    wherein the first gradient index lens and the optical transmission line are arranged in a depression formed in a surface of the wiring substrate that faces the intermediate substrate.

2. The optical transmission apparatus according to claim 1, wherein each of the first gradient index lens and the second gradient index lens has a refractive index that decreases from its central region to its outer region.

3. The optical transmission apparatus according to claim 1, wherein the first gradient index lens has a numerical aperture that differs from a numerical aperture of the second gradient index lens.

4. The optical transmission apparatus according to claim 3, wherein the first gradient index lens has a numerical aperture smaller than a numerical aperture of the second gradient index lens.

5. The optical transmission apparatus according to claim 1, further comprising:
    a reflector that changes a direction of an optical path located between the first gradient index lens and the second gradient index lens.

6. The optical transmission apparatus according to claim 5, wherein light travelling the optical path extending between the first gradient index lens and the reflector is substantially parallel light.

7. The optical transmission apparatus according to claim 1, further comprising:
    a reflector that changes a direction of an optical path located between the first gradient index lens and the second gradient index lens.

8. The optical transmission apparatus according to claim 1, wherein the stopper is a substantially ring-shaped structure that is in contact with an outer edge portion of the second gradient index lens.

9. The optical transmission apparatus according to claim 1, wherein the stopper is a substantially cylindrical structure that includes an end being in contact with an outer edge portion of the second gradient index lens.

10. The optical transmission apparatus according to claim 9, wherein the substantially cylindrical structure includes a flange portion at the end, the flange portion being in contact with the intermediate substrate.

11. An optical transmission apparatus comprising:
    a first gradient index lens connected to an end of an optical transmission line;
    an optical transmitter that transmits light, the optical transmitter being provided to an electronic device, the electronic device being mounted on an intermediate substrate, the intermediate substrate being mounted on a wiring substrate, and the intermediate substrate having a through-hole penetrating therethrough in a stacking direction with respect to the wiring substrate;
    a second gradient index lens arranged between the first gradient index lens and the optical transmitter, and at least partly arranged in the through-hole of the intermediate substrate; and
    a stopper that positions the second gradient index lens with respect to the optical transmitter, the stopper being arranged at an end of the through-hole of the intermediate substrate, the end being adjacent to the electronic device,
    wherein the first gradient index lens and the optical transmission line are arranged in a depression formed in a surface of the wiring substrate that faces the intermediate substrate.

12. The optical transmission apparatus according to claim 11, wherein each of the first gradient index lens and the second gradient index lens has a refractive index that decreases from its central region to its outer region.

13. The optical transmission apparatus according to claim 11, wherein the first gradient index lens has a numerical aperture that differs from a numerical aperture of the second gradient index lens.

14. The optical transmission apparatus according to claim 13, wherein the first gradient index lens has a numerical aperture smaller than a numerical aperture of the second gradient index lens.

15. The optical transmission apparatus according to claim 11, further comprising:
    a reflector that changes a direction of an optical path located between the first gradient index lens and the second gradient index lens.

16. The optical transmission apparatus according to claim 15,
    wherein light travelling the optical path extending between the first gradient index lens and the reflector is substantially parallel light.

17. The optical transmission apparatus according to claim 11, further comprising:
    a reflector that changes a direction of an optical path located between the first gradient index lens and the second gradient index lens.

18. The optical transmission apparatus according to claim 11, wherein the stopper is a substantially ring-shaped structure that is in contact with an outer edge portion of the second gradient index lens.

19. The optical transmission apparatus according to claim 11, wherein the stopper is a substantially cylindrical structure that includes an end being in contact with an outer edge portion of the second gradient index lens.

* * * * *